United States Patent [19]

Okutsu et al.

[11] Patent Number: 5,774,753
[45] Date of Patent: Jun. 30, 1998

[54] FILM SHEET UNIT WHICH EASILY ACCEPTS A LID OF A FILM PACK

[75] Inventors: Taro Okutsu; Yasuhiko Kitamura; Yoshio Hara, all of Kanagawa, Japan

[73] Assignee: Fuji Photo Film Co., Ltd., Kanagawa, Japan

[21] Appl. No.: 901,241

[22] Filed: Jul. 25, 1997

Related U.S. Application Data

[63] Continuation of Ser. No. 591,689, Jan. 25, 1996, abandoned.

[30] Foreign Application Priority Data

Jan. 30, 1995 [JP] Japan ................................ 7-012562

[51] Int. Cl.$^6$ ............................ G03B 17/26; G03B 19/10
[52] U.S. Cl. ........................ 396/366; 396/517; 396/524; 396/528
[58] Field of Search .................................. 396/360, 366, 396/367, 511, 512, 517, 518, 524, 527, 528

[56] References Cited

U.S. PATENT DOCUMENTS 4,236,798  12/1980  Sylvester ............................. 396/366
4,534,053  8/1985  Eloranta et al. .................... 354/276 X
4,804,989  2/1989  Kumanomido ...................... 354/283
5,223,381  6/1993  Hara et al. ......................... 354/277 X
5,448,324  9/1995  Okano et al. ....................... 396/518

Primary Examiner—Safet Metjahic
Assistant Examiner—J. K. Han
Attorney, Agent, or Firm—Sughrue, Mion, Zinn, Macpeak & Seas, PLLC

[57] ABSTRACT

A film sheath, holding a sheet film to constitute a sheet film unit, is formed from a plastic resin, and is provided with at least a tapered portion in an end fringe which is directed toward a leading end of a sliding lid when the sliding lid is moved back to a closed position in a sheet film pack containing a stack of such sheet film units, so as to provide a sufficiently large gap between two of the stacked sheet film units, for smooth thrusting of the sliding lid into between the two sheet film units. The film sheath also has a protuberance in a corner of an open end, as a stop member for stopping the sheet film from slipping out of the film sheath.

13 Claims, 10 Drawing Sheets

FILM SHEET UNIT WHICH EASILY ACCEPTS A LID OF A FILM PACK

This is a Continuation of application Ser. No. 08/591,689 filed Jan. 25, 1996, now abandoned.

BACKGROUND OF THE INVENTION

1. Field of the Invention

The present invention relates to a film sheath made of a plastic resin, holding a photographic sheet film so as to protect the sheet film from scratches and keep the sheet film flat. Particularly, the present invention relates to a plastic resin film sheath of a sheet film unit, which allows a sliding lid of a sheet film pack to thrust smoothly into between two sheet film units laid on top of another.

2. Background Art

The film sheath has been used for holding a photographic sheet film, for example, a 4×5 inch sheet film, to protect the sheet film from scratches and keep the same flat. A sheet film accommodated in a film sheath is called a sheet film unit. The film sheath is conventionally made of a metal. The metal film sheath is constituted of a flat backing plate for backing a base surface of the sheet film to keep it flat and a framing portion formed by folding four sides of the flat plate down to frame and fringe the four margins of the sheet film along four margins.

U.S. Pat. No. 5,448,324 discloses a sheet film pack containing a plurality of such sheet film units, and a pack holder for holding the sheet film pack. As shown in FIG. 11, a plurality of sheet film units 33, each constituted of a film sheath 31 and a sheet film 32, are piled up in the sheet film pack 35, and the sheet film pack 35 is loaded in the pack holder 36 such that the sheet film 32 of the sheet film units 33 are seriatim exposed through a large-size camera by reciprocating a sliding lid 37 of the sheet film pack 35 relative to a pack main body 42.

That is, after the sheet film pack 35 is loaded in the pack holder 36, and when a hinged lid 38 of the pack holder 36 is closed, a protrusion 38 formed on an inside wall of the hinged lid 38 depresses a not-shown projection of a not-shown clutch member of a cap 41, so that the cap 41 is disengaged from the sliding lid 37, allowing the sliding lid 37 to move relative to the pack main body 42.

Responsive to the sliding lid 37 being pulled out to a given position, the uppermost sheet film unit 33 of the stack moves out through an opening 42a of the pack main body 42 to an exposure position defined by the hinged lid 38. By moving the sliding lid 37 back to the initial position, the sliding lid 37 is inserted between the uppermost sheet film unit and the next sheet film unit. After a shutter of the camera is released to expose the uppermost sheet film unit 33, the sliding lid 37 is again pulled out. Then, an inner frame 44 of the pack holder 36, holding the sheet film pack 35 therein, is drawn out of a holder main body 43 along with the sliding lid 37. At that time, the exposed sheet film unit 33 is left in the exposure position as being stopped by a lateral ridge 45 formed on the inner wall of the hinged lid 38. Then, the exposed sheet film unit 33 is pushed down to a bottom of the holder main body 43 by four leaf springs 47 which are mounted on both sides of an exposure opening 46 formed through the hinged lid 38.

Thereafter the sliding lid 37 is pushed to return the inner frame 44 to the initial position in the holder main body 43, together with the pack main body 42. At that time, the exposed sheet film unit 33 is inserted into the bottom of the stack of the unexposed sheet film units 33 through a not-shown slit formed between the bottom wall and an end wall (not-shown) of the pack main body 42. In this way, the sheet film units 33 are exposed one after another. The cap 41 is automatically attached to the pack main body 42 so as to cover the slit and latch the sliding lid 37 in the closed position when the sheet film pack 35 is unloaded from the pack holder 36, so as to shield the sheet film units 33 from ambient light.

OBJECT OF THE INVENTION

A film sheath may be made of a plastic resin. Such a resin film sheath may have a flat backing plate and a framing portion. However, in order to form the film sheath by resin molding, it is necessary to provide an open side and channel-like grooves in the framing portion for allowing the sheet film to slide into the sheath as well as for allowing removal of the film sheath from its molds.

To permit insertion of the sliding lid between the first and second upper most sheet film units, it is necessary to provide a sufficient gap between end edges of the film sheath of the two adjacent sheet film units, which are confronted with a leading end of the sliding lid being moved back to the closed position. Since the film sheath must have a small thickness, it may be desirable, in view of moldability, to round the end edge of each film sheath.

The rounded end edge may be adequate for smooth handling of the sliding lid in moderate conditions. However, if the sliding lid should be handled roughly, the leading end of the sliding lid can strike against the end edge of the film sheath.

The sheet film unit using the plastic resin sheath has another problem that, if the sheet film is largely curled, the sheet film can slip out of the sheath through its open end during the reciprocating movement of the sliding lid. Once the sheet film has slipped out of the sheath, it is impossible to continue operating the sliding lid for photography.

In view of the foregoing, an object of the present invention is to provide a film sheath for a sheet film unit which ensures smooth insertion of the sliding lid between two piled sheet film units.

Another object of the present invention is to provide a film sheath which reliably prevents the sheet film from slipping out of the film sheath even if the sheet film is curled to a great degree.

SUMMARY OF THE INVENTION

To achieve the above objects in a film sheath of a sheet film unit holding a photographic sheet film, the present invention provides a backing plate for backing a base surface of the sheet film to keep the sheet film flat; a framing portion formed integrally with the backing plate from a plastic resin, the framing portion comprising an end fringe, two side fringes and a groove formed between the fringes and the backing plate so as to hold the sheet film along three margins thereof; and an open end disposed in opposition to the end fringe, for permitting insertion of the sheet film from the open end into the film sheath along the groove, wherein at least a portion of the end fringe is tapered off to an end edge of the film sheath.

When the sheet film units of the invention are piled up in the sheet film pack, the end fringe of the framing portion of the film sheath is confronted with a leading end of a sliding lid when the sliding lid is moved back to the closed position in a sheet film pack.

Because the sufficiently large gap is provided at least partly between the end fringes of the piled sheet film units, the photographer can insert the sliding lid smoothly between the two sheet film units. Preferably, the sufficiently large gap is provided between those portions of the end fringes where the sheet film units first came into contact with the sliding lid of the sheet film pack that is being moved back to the closed position.

To prevent the sheet film from slipping out of the film sheath, the present invention includes a protuberance as a film stop member at least in a corner of an open end of the film sheath so as to close a groove of a side fringe. The protuberance or film stop member may be formed after the sheet film is completely inserted in the film sheath, to stop the sheet film at its end margin that is placed in the open end of the film sheath.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
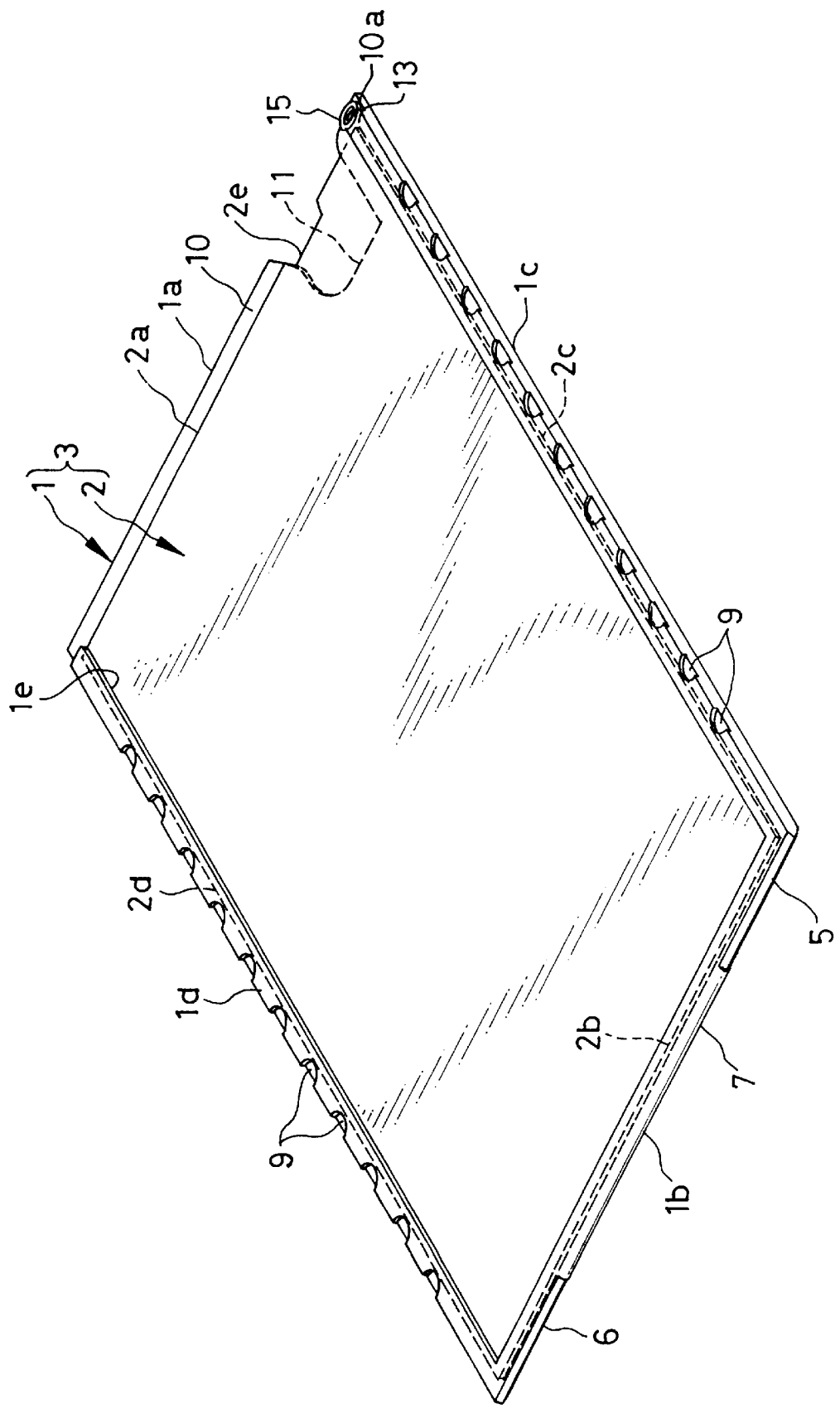
FIG. 1 is a perspective view of a sheet film unit using a film sheath according to a preferred embodiment of the invention.
Figure 2:
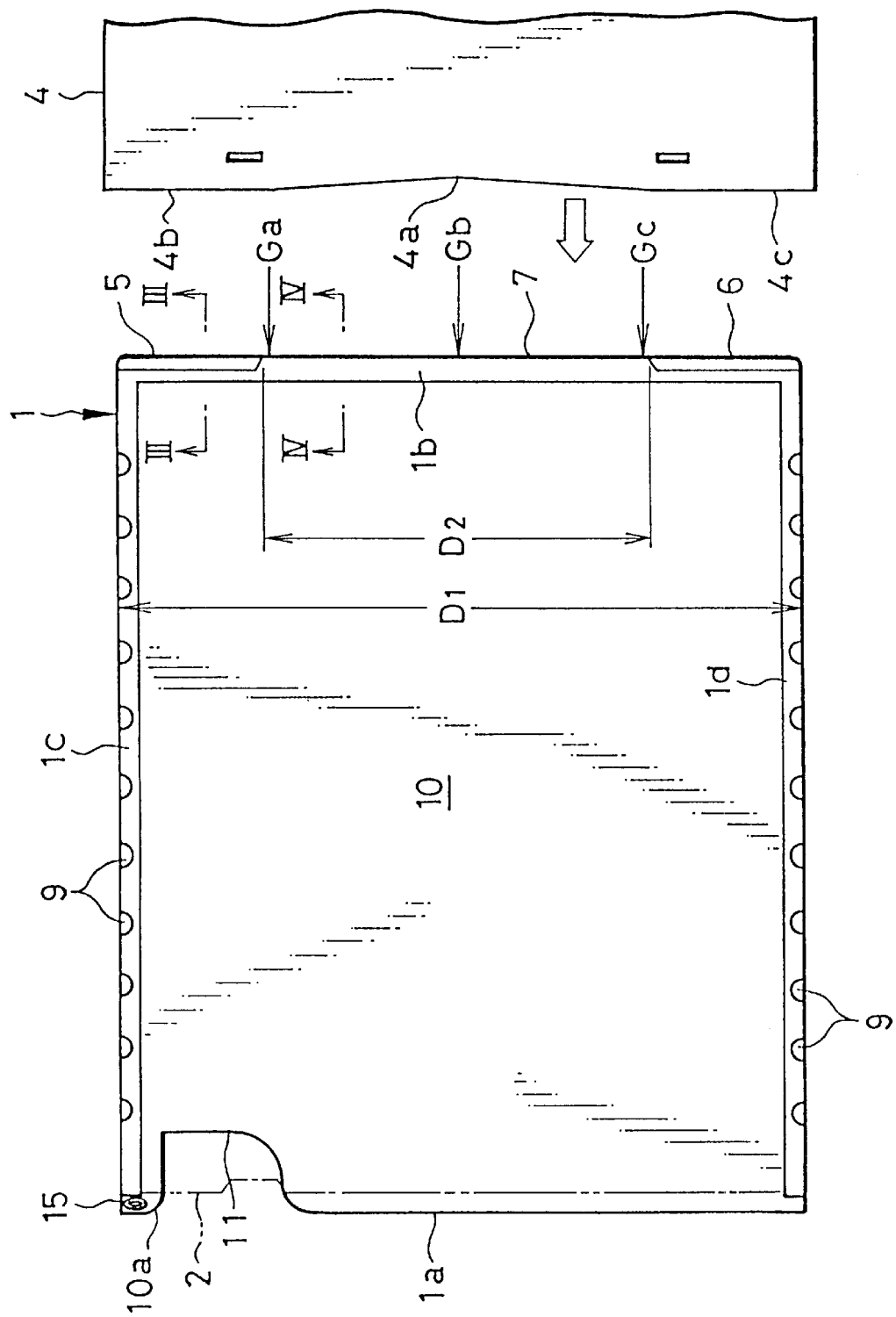
FIG. 2 is a top plan view of the film sheath according to the embodiment of FIG. 1, in combination with a sliding lid of a sheet film pack.

In FIGS. 1 and 2, a plastic resin film sheath 1 holds a 4×5 inch sheet film 2 to constitute a sheet film unit 3. The film sheath 1 is constituted of a backing plate 10 and a framing portion which is open at one end 1a and has an end fringe 1b opposite to the open end 1a, and side fringes 1c and 1d disposed along side margins of the film sheath 1. A channel-like groove 1e is formed between the framing portion and the backing plate 10, to guide and hold the sheet film 2 in the film sheath 1. Thus, an end 2a of the sheet film 2 is disposed on the open end 1a of the film sheath 1 and a second end 2b is covered with the end fringe 1b, while side margins 2c and 2d of the sheet film 2 are covered with the side fringes 1c and 1d.

Figure 11:
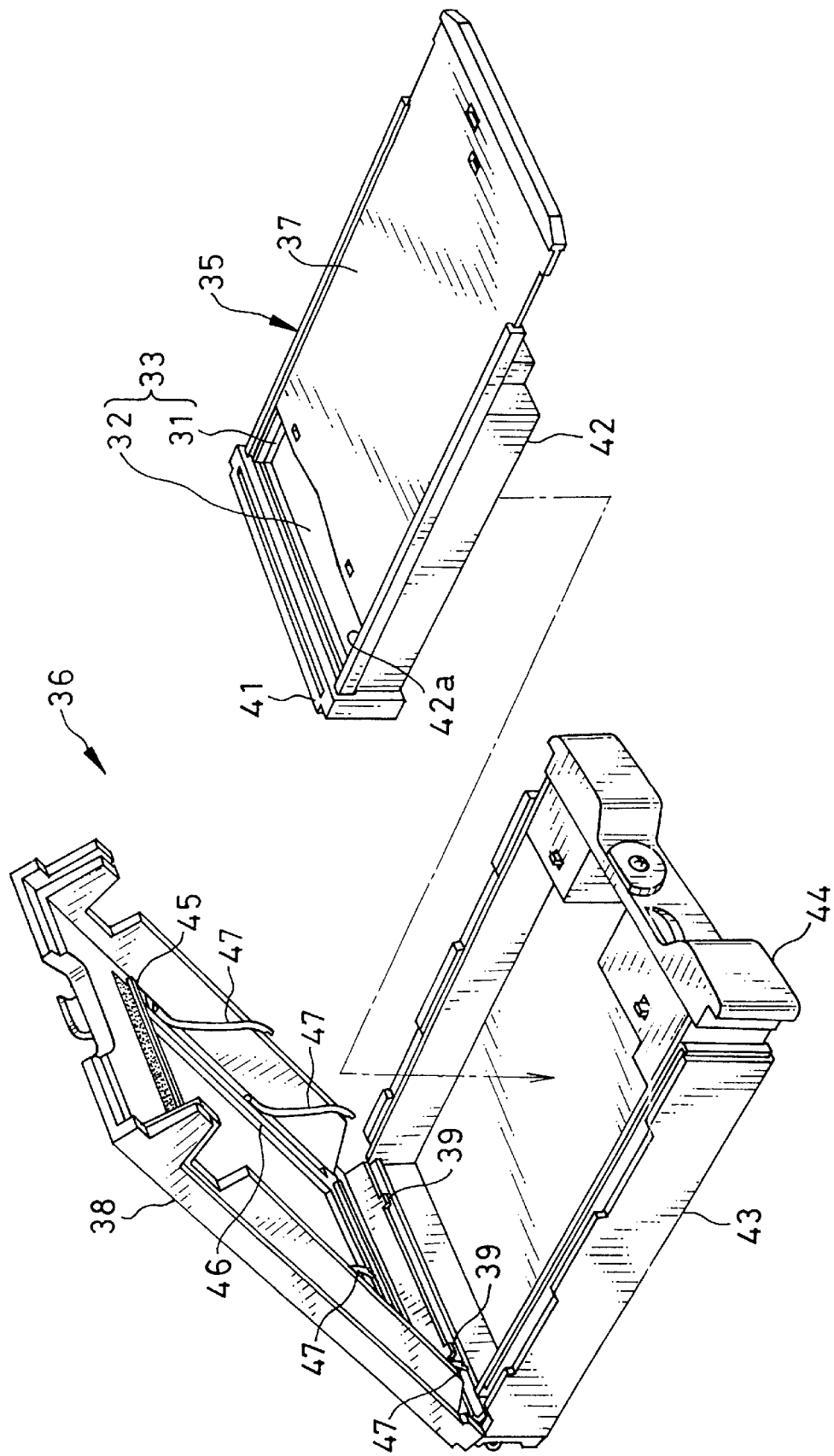
FIG. 11 is a perspective view of a known sheet film pack and a known pack holder for holding the sheet film pack.

A plurality of such sheet film units 3 are laid in a stack in a sheet film pack (not-shown) which may be similar to the sheet film pack 35 shown in FIG. 11. A leading end of a sliding lid 4 of the sheet film pack with respect to a direction toward the sheet film units 3, is concave. As a result, a middle portion 4a of the leading end of the sliding lid 4 comes into contact with the sheet film units 3 after side portions 4b and 4c on opposite sides of the middle portion 4a of the leading end of the sliding lid 4 first come into contact with the sheet film units 3.

Figure 3:
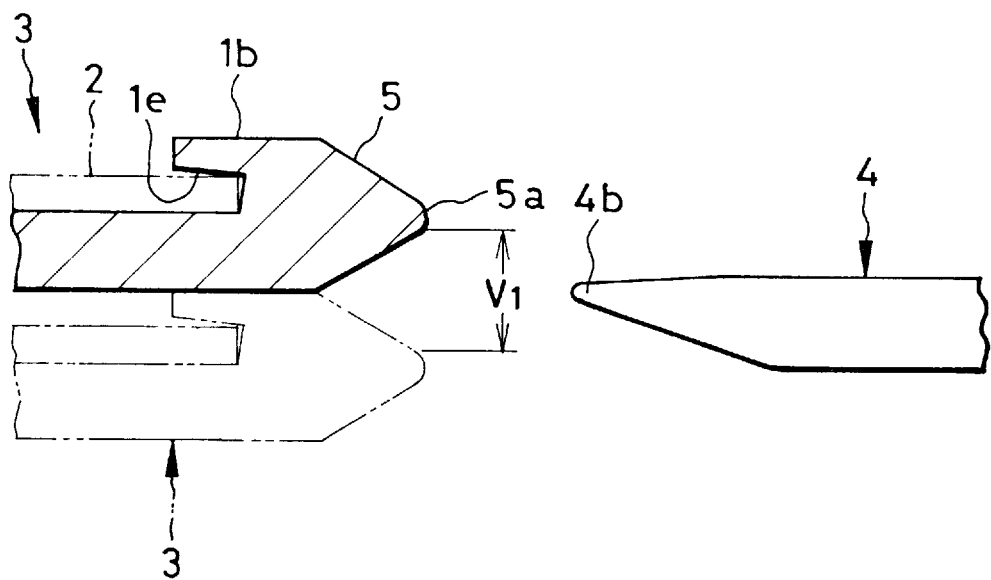
FIG. 3 is a sectional view taken along a line III—III of FIG. 2, illustrating a tapered side portion of an end fringe of the film sheath.
Figure 4:
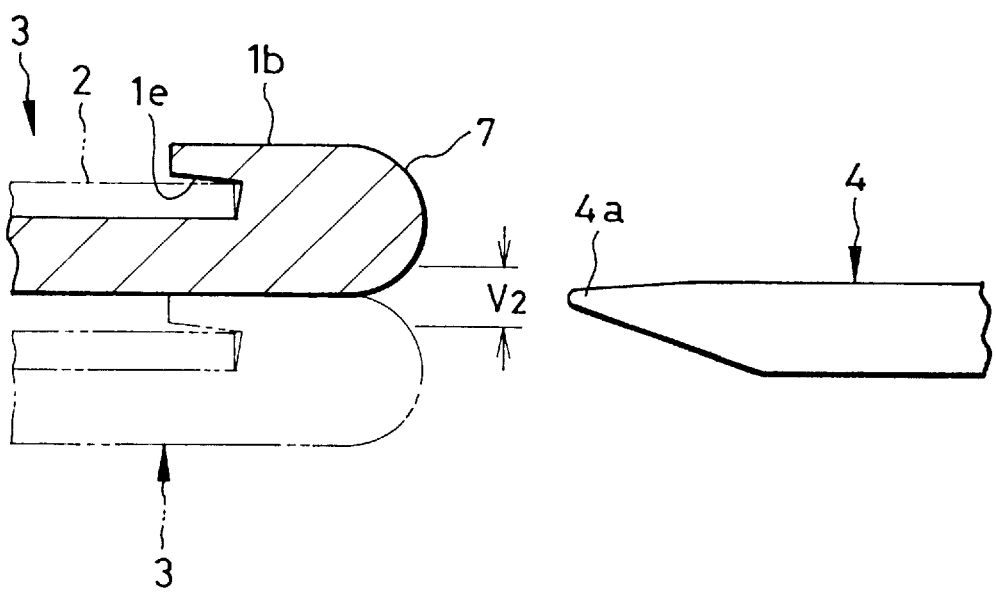
FIG. 4 is a sectional view taken along a line IV—IV of FIG. 2, illustrating a rounded middle portion of the end fringe.

The end fringe 1b, which is directed toward the leading end of the sliding lid 4 to be moved back to the closed position, is tapered off toward an end edge of the film sheath 1 in its side portions 5 and 6 so that the side portions 5 and 6 are shaped into V-shape in section, as shown with respect to the side portion 5 in FIG. 3. The side portions 5 and 6 are where the side portions 4b and 4c of the sliding lid 4 first come into contact with the sheet film unit 3. The end edge or tip 5a of the V-shape of the tapered side portion 5 is rounded, e.g., with a radius of curvature of 0.2 mm. The side portion 6 has the same configuration as the side portion 5. On the other hand, a middle portion 7 of the end fringe 1b is rounded, e.g., with a radius of curvature of 0.7 mm, into a semi-circular shape in section, as shown in FIG. 4.

Accordingly, in the side portion 5 of the fringe 1b, a gap V1 is provided between adjacent two of the sheet film units 3 laid in a stack, and the gap V1 is large enough for the sliding lid 4 to enter into the space between the two sheet film units 3. In comparison, in the middle portion 7 of the fringe 1b, a relatively small gap V2 is provided that allows the sliding lid 4 to enter into the space between the sheet film units 3. As a preferable example, the film sheath 1 is 104 mm in width D1, i.e. the length of the fringe 1b, and the middle portion 7 has a length D2 of 60 mm, whereas the backing plate 10 has a thickness of 0.8 mm or less.

Because the sheet film units 3 provide the sufficiently large gap V1 in their side portions 5 and 6 in the piled condition, and the side portions 5 and 6 are where the sliding lid 4 of the sheet film pack first comes into contact with the sheet film units 3 when the sliding lid 4 is being moved back to separate the uppermost sheet film unit 3 from the next sheet film unit 3 of the stack, the photographer can insert the sliding lid 4 smoothly between the two sheet film units 3.

Figure 12:
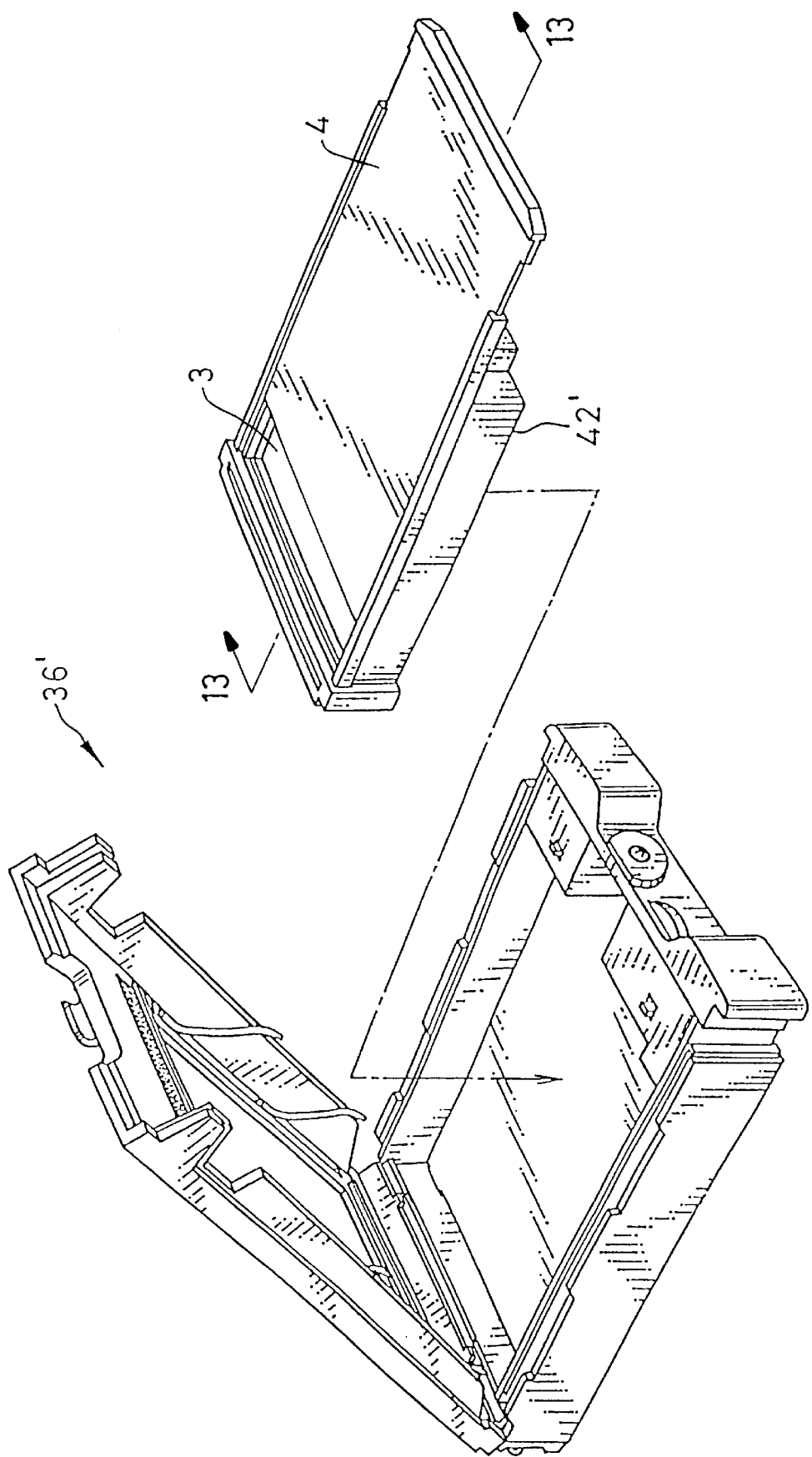
FIG. 12 illustrates the pack holder and pack main body of the preferred embodiment.
Figure 13:
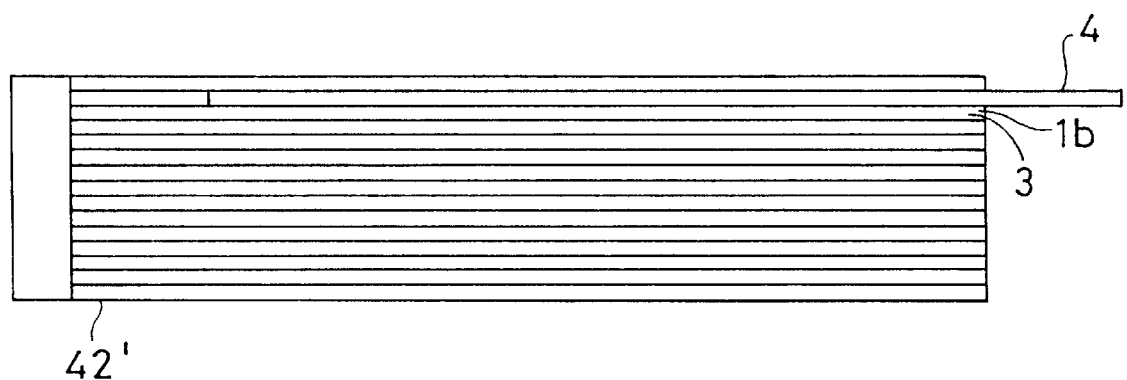
FIG. 13 illustrates a cross-sectional view of the pack holder as taken along line 13—13 in FIG. 12.

FIG. 12 illustrates pack holder 42' and pack main body 36' into which the sheet film units 3 are inserted.

The film sheath 1 is formed by injection molding of a plastic resin, e.g., polystyrene (PS). It is preferable to form the film sheath 1 from a high fluidity high impact polystyrene which has physical properties as shown in Table 1, but another plastic resin having the same physical properties is applicable. The plastic resin is injected through three mold gates (not shown). The mold gates are located in the middle portion 7 of the end fringe 1b as indicated by arrows Ga, Gb and Gc in FIG. 2. Because of the semi-circular sectional shape, the middle portion 7 permits locating the mold gates, and thus permits forming the tapered side portions 5 and 6 even when the thickness of the backing plate 10 is not more than 0.8 mm.

TABLE 1

| ITEM | TEST METHOD | UNIT | PHYSICAL VALUE |
|---|---|---|---|
| YIELD STRENGTH IN TENSION | JIS K-7117 | kg/cm$^2$ | 185–350 |
| TENSILE BREAK ELONGATION | JIS K-7113 | % | 25–50 |
| IZOD IMPACT STRENGTH | JIS K-7110 | kg · cm/cm | 3.7–7.0 |
| VICAT SOFTENING POINT | JIS K-7206 | °C. | 60–115 |
| MFI | JIS K-7210 | g/10 min | 6–12 |
| CARBON CONTENT | — | % | 0.2–5.0 most preferably 0.5–1.0 |

To form the fringes 1b to 1d with the groove 1e by molding, a plate having a similar shape to the sheet film 2 is slidably mounted inside the molds. The slidable plate is slid out of the molds before the content of the molds, i.e. the film sheath 1, is removed from the molds. In order to prevent the film sheath 1, which has just become hard, from being distorted by the removal of the slidable plate, it is necessary to fix the film sheath 1 so as not to move in the molds. For this purpose, there are provided mold core clamping members on opposite lateral sides of the film sheath 1 contained in the molds. Recesses 9 formed on the side fringes 1c and 1d are due to the mold core clamping members.

A cut-out 11 is formed in the backing plate 10 at the open end 1a of the film sheath 1. The cut-out 11 permits gripping the sheet film 2 to insert the same fully into the film sheath 1 when assembling into the sheet film unit 3, as well as to take it out from the film sheath 1 for photofinishing. The cut-out 11 also permits checking a notch 2e of the sheet film 2 from both the front and rear sides of the film sheath 1. The notch 2e is formed in the end 2a of the sheet film 2 to discriminate between the obverse or photosensitive surface and the reverse or base surface of the sheet film 2, and also indicate the type of the sheet film 2.

Figure 5:
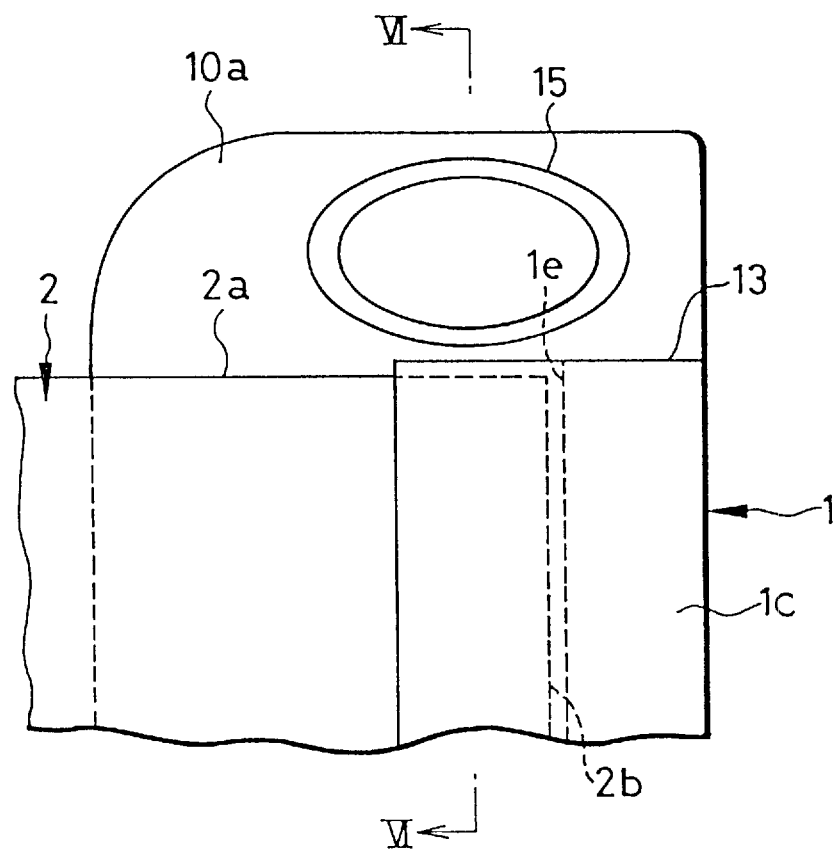
FIG. 5 is an enlarged fragmentary top plan view illustrating a corner of the open end of the film sheath having a film stop member.
Figure 6:
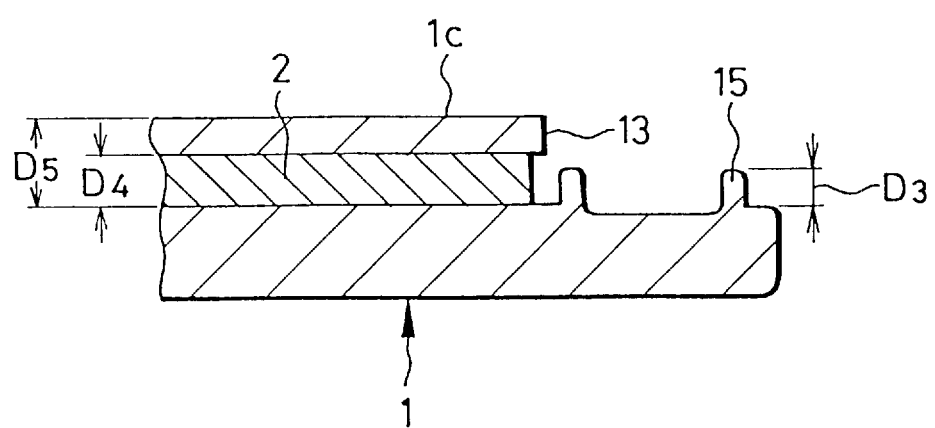
FIG. 6 is a sectional view taken along a line VI—VI of FIG. 5.

In a corner 10a of the open end 1a, a film stop member 15 is provided on the backing plate 10, for stopping the sheet film 2 from slipping out of the film sheath 1. As shown in FIG. 5, the film stop member 15 is disposed adjacent to an end 13 of the side fringe 1b so as to close the groove 1e at the end 13. The stop member 15 is an oval ring protuberance, as shown in FIG. 6. The stop member is formed after the sheet film 2 is inserted in the film sheath 1, for example, by heat sealing, hot plate welding, ultrasonic welding, or the like. The stop member or protuberance 15 preferably has a height D3 which is not less than one-half of thickness D4 of the sheet film 2, but less than height D5 of the fringes 1b to 1d from the backing plate 10.

In this way, the sheet film 2 is prevented from slipping out of the film sheath 1 even if the sheet film 2 is curled to a large extent. It has been proved that the sheet film 2 could slip out if the height D3 is less than one-half of the thickness D4. On the other hand, if the height D3 is not less than the height D5, the sheet film units 3 cannot be flat when piled up in the film pack.

The sheet film 2 can be removed from the sheath 1 by picking up the sheet film 2 at a portion located in the cut-out 11 so as to enable the sheet film 2 to pass over the protuberance 15 by drawing out the sheet film 2. Edges of the protuberance 15 are rounded so as not to scratch the sheet film 2.

Figure 7:
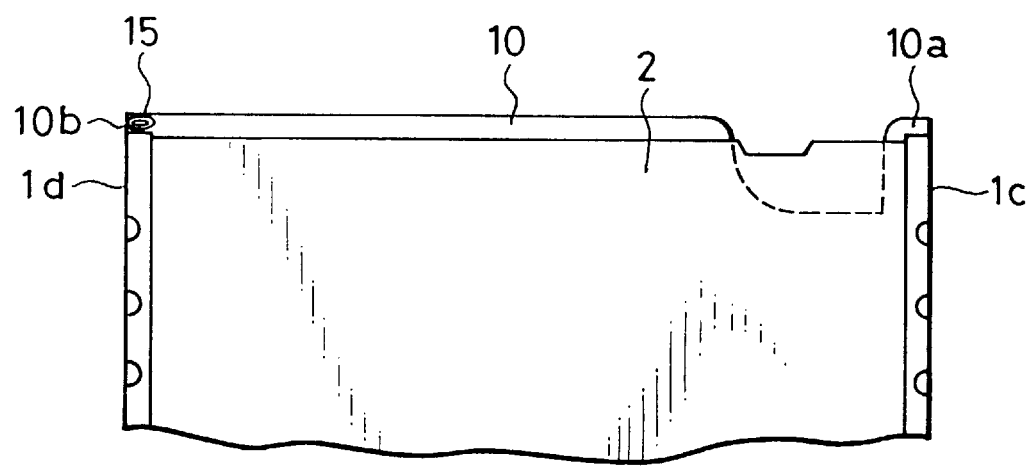
FIG. 7 is a fragmentary top plan view of a film sheath of another embodiment wherein a film stop member is disposed in the other corner of the open end of the film sheath.
Figure 8:
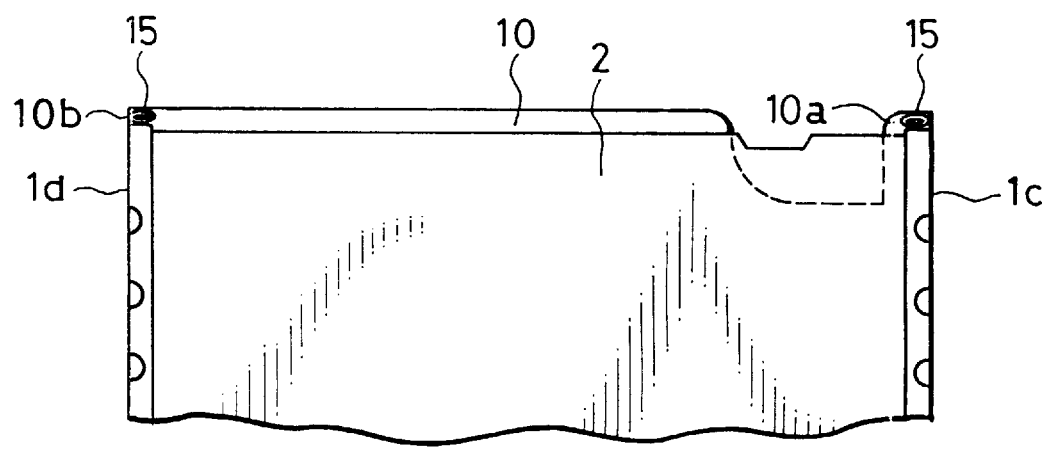
FIG. 8 is a fragmentary top plan view of a film sheath of another embodiment wherein film stop members are disposed in both corners of the open end of the film sheath.
Figure 9:
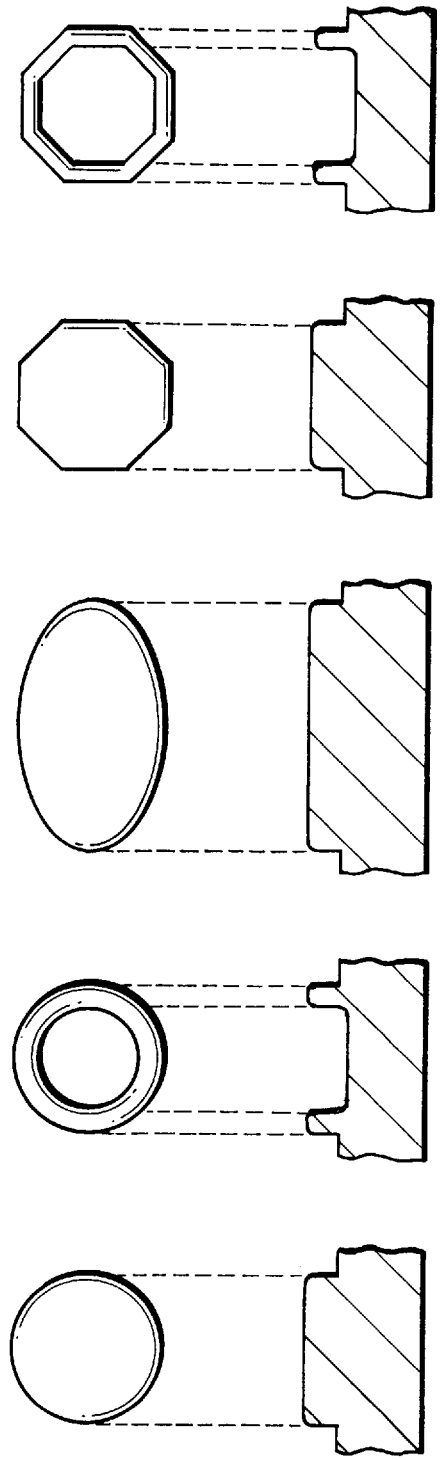
FIGS. 9A, 9B, 9C, 9D and 9E are explanatory views illustrating variations of film stop members for the film sheath.

As shown in FIG. 7, the stop member 15 may be disposed on the other corner 10b of the open end 1a adjacent to an end of the side fringe 1d. It is also possible to dispose the stop members 15 on both corners 10a and 10b, as shown in FIG. 8.

The stop member 15 may have another shape, such as a circle, a circular ring, an oval, a polygon, a polygonal ring, and so forth, as shown in FIGS. 9A to 9E. But the oval ring stop member 15 extending over the width of the fringe 1c as shown in FIG. 5 is preferable because it fully closes the groove 1e at the end 13, has a rounded surface in opposition to the end margin 2a of the sheet film 2a, and is easy to mold.

Figure 10:
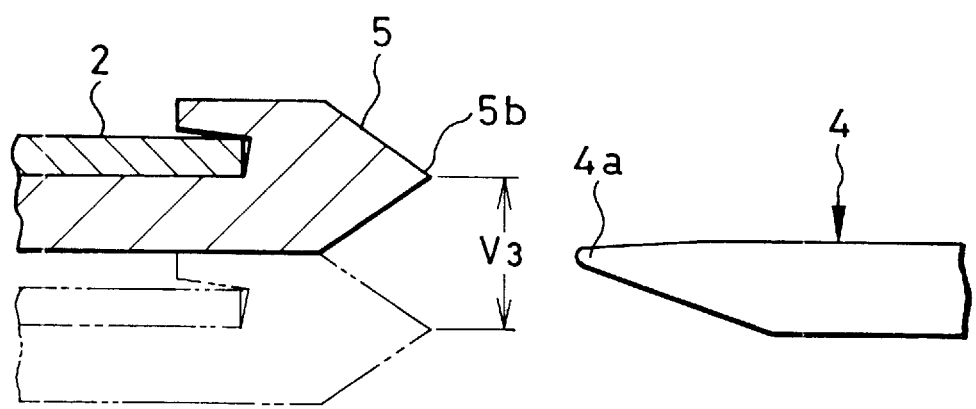
FIG. 10 is a sectional view similar to FIG. 3, but illustrating a film sheath having a modified tapered side portion in the end fringe.

In the alternative, each side portion 5 or 6 of the end fringe 1b may be tapered off into a sharp V-shape in section, whose end edge or tip 5b is not rounded but acute, as is shown in FIG. 10. This configuration provides a still larger gap V3 in the side portions 5 and 6 of the end fringe 1b, in comparison with the embodiment of FIG. 3. Therefore, the sliding lid 4 is more smoothly insertable between the piled sheet film units 3.

It is possible to incline only one surface of the end fringe 1b to taper it. It is also possible to taper only one side portion 5 or 6 of the end fringe 1b.

Thus, the present invention should not be limited to the above-described embodiment but, on the contrary, various modifications may be possible to those skilled in the art without departing from the scope of the invention as claimed in the appended claims.

What is claimed is:

1. A film storage system having a sheet film pack and a sheet film unit comprising a film sheath holding a photographic sheet film, said film sheath comprising:
a backing plate for backing a base surface of said sheet film to keep said sheet film flat;
a framing portion formed integrally with said backing plate from a plastic resin, said framing portion comprising an end fringe, two side fringes and a groove formed between said end fringe and said backing plate and between said two side fringes and said backing plate so as to hold said sheet film along three margins thereof, at least a portion of said end fringe being tapered off to an end edge of said film sheath; and
an open end disposed in opposition to said end fringe, for permitting insertion of said sheet film from said open end into said film sheath along said groove, wherein a plurality of said sheet film units are packed in said sheet film pack in a light-tight fashion, and wherein said sheet film pack is loaded in a pack holder for photography, and comprises:
a pack main body for accommodating said plurality of sheet film units piled up in a stack; and
a sliding lid slidable relative to said pack main body to open and close an opening of said pack main body, through which an uppermost one of said stack of sheet film units is moved out of said pack main body responsive to said sliding lid being drawn out to open said opening, said sliding lid being thereafter moved back to a closed position to close said opening, while being inserted between said uppermost sheet film unit and a second sheet film unit next to said uppermost sheet film unit, to set said uppermost sheet film unit in an exposure position in said pack holder.

2. A film storage system according to claim 1, wherein, in said sheet film pack, said end fringe of said film sheath of each of said plurality of sheet film units is directed toward an end of said sliding lid which is a leading end of said sliding lid when said sliding lid is moved back to the closed position.

3. A film storage system according to claim 2, wherein a portion of said leading end of said sliding lid is concave, and said end fringe is tapered off in side portions thereof where said leading end of said sliding lid first comes into contact with said uppermost and second sheet film units when said sliding lid is moved back to the closed position.

4. A film storage system according to claim 3, wherein said end fringe is rounded in a middle portion between said tapered side portions.

5. A film storage system according to claim 4, wherein said film sheath is formed by injection molding, and mold gates are located in said middle portion of said end fringe.

6. A film storage system according to claim 5, wherein said end edge is rounded in said tapered side portions.

7. A film storage system according to claim 1, wherein a protuberance is provided in a corner of said open end of said film sheath proximate an end of one of said side fringes so as to close said groove at said end and stop said sheet film from slipping out of said film sheath.

8. A film storage system according to claim 7, wherein a second protuberance is provided in a second corner of said open end of said film sheath proximate an end of a second one of said side fringes.

9. A film storage system according to claim 7, wherein said protuberance has a shape of an oval ring.

10. A film storage system according to claim 7, wherein said protuberance has a height which is not less than one half of thickness of said sheet film, but less than a distance between said fringes and said backing plate.

11. A film storage system having a sheet film pack and a sheet film unit comprising a film sheath holding a photographic sheet film,
said film sheath comprising:
a backing plate for supporting a base surface of said sheet film to keep said sheet film flat;
a framing portion formed integrally with said backing plate, said framing portion comprising an end fringe, two side fringes and a groove formed between said end fringe and said backing plate and between said two side fringes and said backing plate so as to hold said sheet film along three margins thereof, at least a portion of said end fringe being tapered off to an end edge of said film sheath; and
an open end disposed in opposition to said end fringe, for permitting insertion of said sheet film from said open end into said film sheath along said groove, wherein a plurality of said sheet film units are packed in said sheet film pack in a light-tight fashion, and wherein
said sheet film pack comprises:
a pack main body for accommodating said plurality of sheet film units piled up in a stack; and
a sliding lid slidable relative to said pack main body to open and close an opening of said pack main body, said sliding lid inserted between adjacent film units.

12. A film storage system having a sheet film pack and a sheet film unit comprising a film sheath holding a photographic sheet film,
said film sheath comprising:
a backing plate for supporting a base surface of said sheet film to keep said sheet film flat;
means for retaining said sheet film on said backing plate; and
wherein a plurality of said sheet film units are packed in said sheet film pack in a light-tight fashion; and
said film storage system further comprises means for facilitating insertion of a sliding lid between adjacent ones of said film units, said facilitating means comprising an end of said film sheath that opposes a leading edge of said sliding lid when said sliding lid is inserted between said film units, said end of said film sheath comprising tapered portions and an untapered portion disposed between said tapered portions.

13. A film storage system as recited in claim 12, wherein a portion of said leading edge is concave and said tapered portions are formed on portions of said film sheath that first contact portions of said leading edge other than said concave portion when said sliding lid is inserted between said film units.

* * * * *